(No Model.) 2 Sheets—Sheet 1.
W. G. GRAY.
COMBINED COTTON SEED PLANTER AND FERTILIZER DISTRIBUTER.
No. 603,900. Patented May 10, 1898.
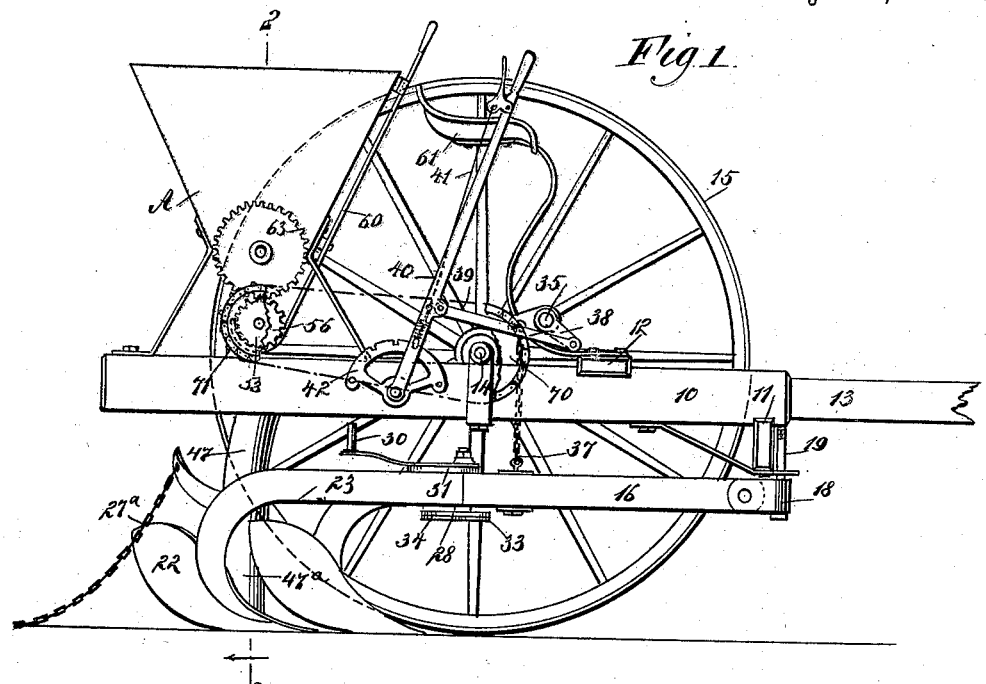
Fig. 1.
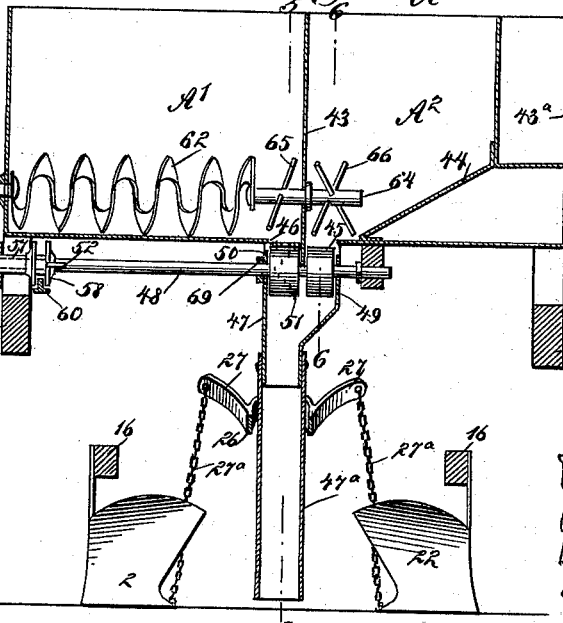
Fig. 2.
Fig. 3.
Fig. 4.
Fig. 8.
WITNESSES:
INVENTOR
W. G. Gray.
BY
ATTORNEYS.

(No Model.) 2 Sheets—Sheet 2.
W. G. GRAY.
COMBINED COTTON SEED PLANTER AND FERTILIZER DISTRIBUTER.
No. 603,900. Patented May 10, 1898.
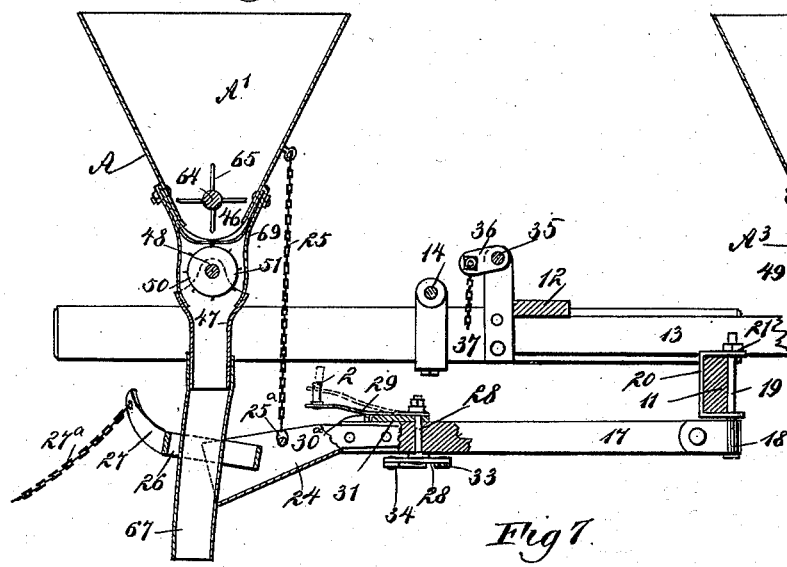
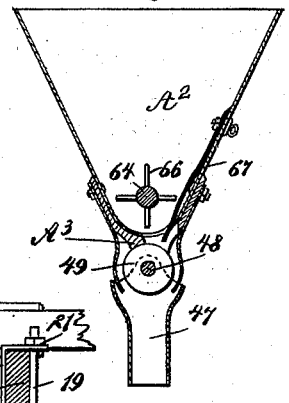
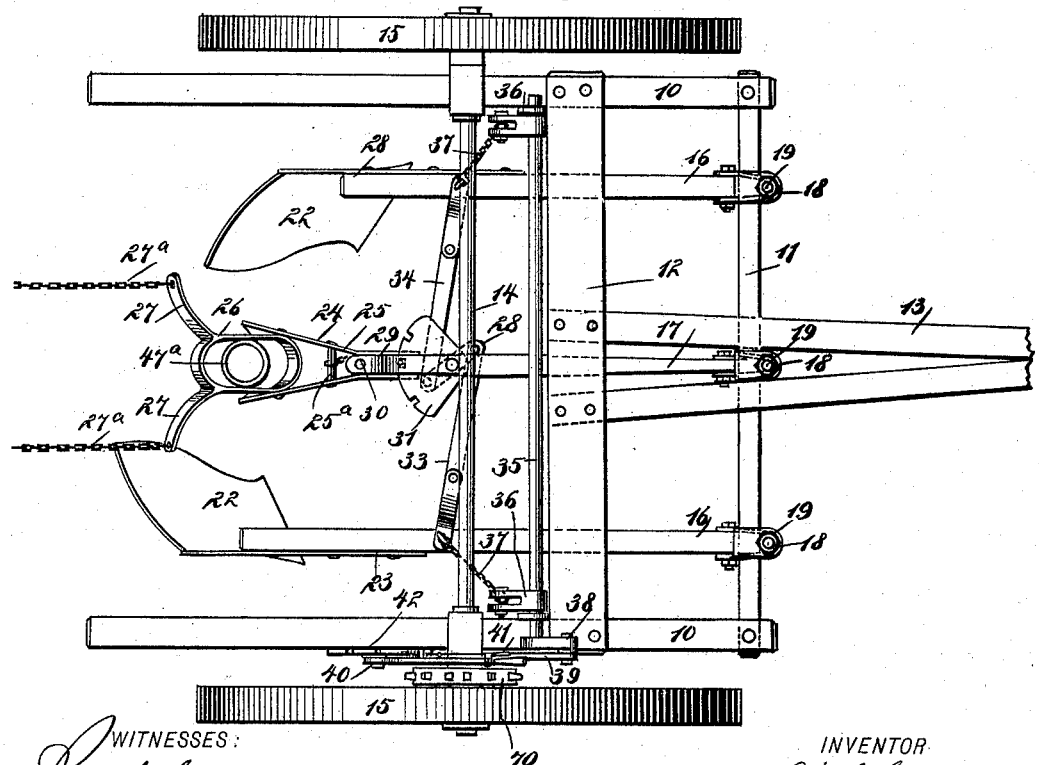
WITNESSES:
INVENTOR
W. G. Gray.
BY
ATTORNEYS.

UNITED STATES PATENT OFFICE.

WALTER G. GRAY, OF MARROWBONE, TENNESSEE, ASSIGNOR TO HIMSELF, AND THOMAS P. ALLEN, OF ELMO, KENTUCKY.

COMBINED COTTON-SEED PLANTER AND FERTILIZER-DISTRIBUTER.

SPECIFICATION forming part of Letters Patent No. 603,900, dated May 10, 1898.

Application filed January 20, 1898. Serial No. 667,334. (No model.)

*To all whom it may concern:*

Be it known that I, WALTER G. GRAY, of Marrowbone, in the county of Cheatham and State of Tennessee, have invented a new and Improved Combined Cotton-Seed Planter and Fertilizer-Distributer, of which the following is a full, clear, and exact description.

The object of my invention is to provide an implement in which will be combined a seed-planting mechanism and a mechanism for distributing fertilizer, together with devices for forming a ridge and trenching the ridge, and after the seed and fertilizing material have been deposited in the trench closing the said trench.

Another object of the invention is to provide a seed-planting mechanism which will take the seeds just as they come from the gin without any other preparation whatever and which will drill the seed evenly and free from bunches.

Another object of the invention is to provide the machine with plows that are adjustable and can be manipulated to make a large or a small ridge with either two or four furrows to the ridge.

Another object of the invention is to construct a machine of the character above described which will be simple, durable, and economic and thoroughly under the control of the driver and to provide a novel form of seed-distributing device which will permit but a few seeds at a time being taken from the hopper and delivered to the drill or chute.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine. Fig. 2 is a vertical transverse section taken on the line 2 2 of Fig. 1. Fig. 3 is a detail side elevation of a clutch used in connection with the feed. Fig. 4 is a detail side elevation of the feed-shaft upon which the clutch shown in Fig. 3 is to operate. Fig. 5 is a vertical transverse section taken practically on the line 5 5 of Fig. 2. Fig. 6 is a vertical section taken practically on the line 6 6 of Fig. 2. Fig. 7 is a plan view of the machine; and Fig. 8 is a view of a portion of the bottom of the seed-compartment, illustrating the grating at the outlet.

The frame of the machine usually consists of two side pieces 10, connected by a front bar 11 and a cross-bar 12, which is between the center of the side bars and the front bar 11. The cross-bar 12 is usually located at the upper portion of the frame. The pole 13 is usually secured to the front bar 11 and to the cross-bar 12, and the axle 14 is preferably carried across the top of the frame, the frame being suspended from the axle, and the axle carries at each of its ends a suitable supporting-wheel 15.

Three beams are suspended from the front portion of the frame—two outer beams 16 and an intermediate beam 17. Each of these beams is preferably provided with a clip 18 at its forward end, and a pin 19 is carried up loosely through the said clip, the pin extending also through clips 20, secured upon the front bar 11, as is particularly shown in Fig. 5, and each pin above the clip is provided with a lock-nut 21. The beams are pivotally attached to their clips, so that the rear ends of the beams may be raised or lowered, as desired. The right-hand beam is longer than the left-hand beam; but the center beam may be of the same length as the left-hand beam, and usually is so made. Each outer beam 16 is provided with a plow 22 at its rear end, connected therewith by suitable curved shanks 23, and at the rear end of the intermediate beam 17 a ridge-opener 24 is pivoted. This ridge-opener is of an inverted-V shape in cross-section and tapers longitudinally, being narrowest at its forward end, and the rear end of the ridge-opener is open. The ridge-opener is pivotally attached to the beam by suitable arms, as shown in Fig. 7, and is prevented from dropping too far downward by a chain 25, which is secured to the front portion of a hopper A, mounted on the frame or from a convenient support, the lower end of the chain being attached to a pin 25$^a$, which is passed through the said opener, as shown in Fig. 5.

A loop 26, preferably of metal, is secured to the rear open portion of the ridge-opener, and the said loop 26 extends rearward and at its rear end is provided with diverging arms 27, one arm being at each side of the loop, the arms being curved in direction of the sides of the machine. Drag-chains 27ª are attached to the said arms 27, the said drag-chains being adapted for closing the trench made by the ridge-opener 24, said chains coming into action after the seed has been planted in the trench.

A lever 29 is pivoted on the central intermediate beam 17, the pivot-pin whereof is secured to the lever and at its lower end is attached to the central portion of a connecting-bar 28. The lever 29 at its rear end is provided with a pin 30, so that the lever may be readily moved laterally. The lever is a spring-lever and is provided with a pin 30ª upon its under face, as shown in Fig. 5, adapted to enter any one of a series of openings in a rack 31, secured beneath the lever on the said intermediate beam.

A link is attached to each end of the connecting-bar 28, the links being designated, respectively, as 33 and 34. The right-hand link 33 is attached to the right-hand beam 16, and the link 34 is connected with the left-hand beam 16. Since the forward ends of the beams are pivoted on the pins 19, the beams may be moved laterally as well as vertically, and by shifting the lever 29 to the right or to the left, so as to draw the links 33 and 34 together or force them apart, the plow-beams 16 may be drawn in direction of one another or carried away from one another, thus bringing the plows 22 closer to or farther away from the ridge-opener.

A shaft 35 is journaled transversely on the frame, preferably forward of the axle 14, and the said shaft 35 is provided near each end with a crank-arm 36, the crank-arms being connected by chains 37 or their equivalents to the plow-beams, so that as the shaft 35 is turned the beams may be raised or lowered. The shaft is usually operated by securing at its right-hand end a crank-arm 38, extending in an opposite direction to the crank-arms 36, the crank-arm 38 being connected by a link 39 with a lever 40, fulcrumed on the side of the frame, the said lever being provided with a suitable thumb-latch 41 for engagement with the rack 42, as shown in Figs. 1 and 7.

The hopper A, heretofore referred to, is supported on the frame at its rear, as shown in Fig. 1. The hopper is divided into two compartments A' and A² by a transverse partition 43, which extends, preferably, through the bottom of the hopper. The hopper inclines downward in opposite directions at its sides, as shown in Fig. 1. The compartment A' is adapted to contain the seed to be planted, while the compartment A² is adapted to contain the fertilizing material.

At the outer end of the fertilizing-compartment A² a locker 43ª is formed, in which tools, lubricant, or other articles may be carried. The bottom 44 of the fertilizing-compartment inclines downward from the outer end of the compartment in direction of the partition 43. At one side of the partition 43 an opening 46 is made in the bottom of the hopper, the said opening being an outlet for the seed, and a like opening 45 is made at the opposite side of the partition in the bottom of the hopper, forming an outlet for the fertilizing material. A chute 47 is made to surround both of the said openings 45 and 46, and the partition 43 effectually divides the said openings. A shaft 48 is journaled in suitable bearings below the hopper, the shaft extending through the chute 47. A simple feed-wheel 49 is secured upon the shaft 48 near its inner end, the said wheel being mounted to revolve in the outlet-opening 45 of the fertilizer-compartment of the hopper, and a second wheel 50 is secured upon the said shaft, mounted to revolve below the outlet 46 for the seed-compartment, both of the wheels 49 and 50 being within the chute 47. The wheel 50, however, is provided with peripheral teeth 51, spirally arranged, and these teeth are adapted to pass between wires 69 or strips, which extend across the outlet-opening 46 from side to side of the hopper, forming a grating for the said opening, as shown best in Fig. 8. A short key 52 is located on the feed-shaft 48 near the outer or right-hand end of the shaft, and at the extreme right-hand end of the shaft a sprocket-wheel 53 is loosely mounted, the said sprocket-wheel being provided with clutch-teeth 54 upon its inner face. A sleeve 57 is held to slide on the shaft 48, which sleeve carries at its outer or right-hand end a clutch 55, adapted for engagement with the clutch-surface of the sprocket-wheel 53, and a pinion 56 is secured upon the sleeve 57 close to the clutch 55, as shown in Fig. 2.

At the inner end of the clutch-sleeve 57 two annular flanges are produced, forming an annular space between them, the said space being adapted to receive the lower end or arm of a shifting lever 60, the said lever being carried upward and mounted to slide along the front of the hopper, as shown in Fig. 1. At the flanged end of the clutch-sleeve 57 a groove 59 is formed which receives the key 52 on the shaft 58, so that while the clutch and pinion 56 when turned will compel the shaft 48 to turn also the sprocket-wheel 53 may turn loosely on the shaft. The driver's seat 61 is usually attached to the cross-bar 12, as shown in Fig. 1.

A screw conveyer 62 is located within the seed-compartment A', one end whereof extends out through the right-hand-end portion of the hopper and has a gear 63 secured to it, adapted to mesh with the clutch-pinion 56. At the other end of the screw conveyer a shaft 64 is attached which extends through the partition 43 into the fertilizing-compartment of the hopper. Agitating-arms 65 and 66 are secured to the shaft 64 at opposite sides of the partition 43 and over the outlets 45 and 46 of the hopper.

The flow of fertilizing material from the compartment A² is regulated through the medium of the slide 67, located upon the inside of the hopper, as shown in Fig. 6, and operated from the outside thereof, the slide being capable of sliding downward to a greater or a less degree into the outlet-opening 45. The power is obtained by securing a sprocket-wheel 70 preferably to the hub of the right-hand wheel, or to the axle 14 if the axle is to turn, the sprocket-wheel 70 being connected with the sprocket-pinion 53 on the feed-shaft by means of a belt 71, as shown in Fig. 1. When the clutch-pinion 56 is carried out of engagement with the driving-pinion 53 and out of mesh with the gear 63 on the conveyer, the entire feed mechanism will be stopped and the plows may be brought into action independently of the feed mechanism.

By arranging the teeth 51 spirally on the feed-wheel 50 and causing the teeth to pass between the bars 69 of the grating covering the outlet for the seed, but few seeds can possibly be taken by any of the teeth at one time from the seed-compartment, so that the chute 47 will never become clogged, or the drill 47ᵃ, which is attached to said chute, and which drill is preferably of a flexible material and extends downward through the loop 26 to a point in front of the lower end of the ridge-opener.

The machine will make a ridge, trench and top the same, plant the cotton-seed and supply the fertilizer, and will then close the trench in the ridge, covering the seed, all of the said operations taking place almost at the same time or in quick succession.

If four furrows are wanted on the ridge, the plows are brought close together and the feed mechanism is then thrown out of gear and the machine is drawn the length of the row. The plows are then carried wide apart, the row is straddled by the machine, the feed mechanism is thrown into gear, and the machine is drawn back.

By taking off the right-hand plow and substituting a left-hand plow a good gang-plow is obtained. The machine can be used also to make potato-ridges without any change, except to remove the drag, and may also be used to list up land for tobacco.

Having thus described my invention, I claim as new and desire to secure by Letters Patent—

1. In a seeder, the combination, with a seed-receptacle, a conveyer, means for driving the conveyer, and an agitator located over the outlet of the said receptacle and connected with the conveyer, of a grating located at the outlet of the seed-receptacle, and a seed-distributing cylinder mounted to revolve below the said grating and provided with teeth arranged to extend upward between the bars of the grating, as and for the purpose specified.

2. In a planter, a seed-receptacle provided with an outlet, a grating located at the outlet, means for feeding the seed toward said outlet, an agitator located over the outlet, and a seed-distributing cylinder mounted to revolve below the grating and provided with spirally-arranged teeth adapted to enter the spaces between the bars of the grating, for the purpose set forth.

3. The combination with a hopper divided into a seed-compartment and a compartment for fertilizing material, the compartments being each provided with an outlet, a screw conveyer located in the seed-compartment and having a shaft at one end extending into the fertilizing-compartment, an agitator located in each compartment over the outlet and secured to the said shaft on the screw conveyer, a distributing-cylinder located below the outlet of each compartment, a shaft upon which the said cylinders are mounted and a driving connection between the said shaft and the said conveyer, as and for the purpose specified.

4. The combination with a receptacle provided with an outlet, a screw conveyer located in the receptacle and having a shaft at one end, an agitator secured to the said shaft and located over the outlet, a distributing-cylinder located below the outlet, a shaft upon which the said cylinder is mounted, a sprocket-wheel loosely mounted on the outer end of the said shaft and provided with clutch-teeth on its inner face, means for driving the said sprocket-wheel, a sleeve held to slide on the said shaft and carrying a clutch adapted for engagement with the clutch-surface of the sprocket-wheel, the said sleeve also carrying a pinion adapted to mesh with a gear on the outer end of the screw conveyer, for the purpose set forth.

5. In a planter or like machine, a hopper divided into a seed-compartment and a compartment for fertilizing material, each compartment being provided with an outlet, a chute surrounding both of said outlets, an agitator in each compartment and mounted to revolve over the outlet thereof, a distributing-cylinder located below the outlet of each compartment and within the said chute, and a slide located within the compartment for fertilizing material and arranged to extend within the outlet thereof, the said slide being adjustable to and from the distributing-cylinder, for the purpose specified.

6. The combination, with a hopper divided into a seed-compartment and a compartment for fertilizing material, each compartment being provided with an outlet, the outlet in the seed-compartment being provided with a grating, of a screw conveyer located in the seed-compartment, an agitator located in each compartment over the outlet therefor, a distributing-cylinder located below the outlet of each compartment, the distributing-cylinder below the outlet of the seed-compartment being provided with pins arranged to enter the space between the bars of the grating, a feed-shaft upon which the said cylinders are mounted, and a driving connection between the said shaft, the conveyer and agitators, as and for the purpose specified.

7. The combination with a support and plow-beams carried by the said support and adjustable laterally and vertically, of a shifting lever having its pivot-pin secured thereto, the said lever being pivoted on a support between the said plow-beams, links connected with the plow-beams, and a connecting-bar attached at its ends to the said links, the pivot-pin of the said shifting lever being attached to the central portion of the connecting-bar, substantially as described.

8. The combination, with a support, and plow-beams carried by the said support, being adjustable laterally and vertically, of a beam between the plow-beams, provided with a ridge-opener, a shifting lever, and a shifting connection between the said lever and the said plow-beams, for the purpose specified.

9. The combination, with a wheeled support, plow-beams pivotally attached to the said support, being capable of vertical and lateral movement, and a beam likewise pivoted to the support between the plow-beams, of a ridge-opener secured to the central beam, a shifting lever located on said central beam, links attached to the plow-beams, and a connecting-bar attached to said lever and to said links, as and for the purpose specified.

10. The combination, with a wheeled support, plow-beams pivotally attached to said support, being capable of vertical and lateral movement, and a beam likewise pivoted to the support between the plow-beams, of a ridge-opener secured to the central beam, a shifting lever located on said central beam, links attached to the plow-beams, a connecting-bar attached to said lever and to said links, means for raising and lowering the beams, and a drag located at the rear of said frame, all combined for operation, as set forth.

11. The combination with a support, plow-beams pivotally attached to said support and capable of vertical and lateral movement, and a beam likewise pivoted to the support between the plow-beams, of a ridge-opener secured to the intermediate beam, a spring-lever pivoted on said intermediate beam and provided with a pin upon its under face adapted to engage one of a series of openings in a rack secured to the said intermediate beam, links connected with the plow-beams, a connecting-bar attached at its central portion to the pivot-pin of said lever and at its ends to the said links, and means for raising and lowering the beams, substantially as set forth.

12. The combination with a support, a hopper carried by said support and means for delivering the material from the hopper, of plow-beams provided with plows and also carried by said support, the said plow-beams being adjustable laterally and vertically, a beam also carried by said support and located between the plow-beams, a ridge-opener carried by said intermediate beam, a shifting device, a connection between the shifting device and the plow-beams, and means for closing the trench, substantially as described.

WALTER G. GRAY.

Witnesses:
JAMES KENT LENOX,
N. N. BINKLEY.